Patented Jan. 8, 1946

2,392,413

UNITED STATES PATENT OFFICE 2,392,413

ACYCLIC TERPENE OXIDATION PRODUCT AND METHOD OF PRODUCTION

Alfred L. Rummelsburg, Wilmington, Del., assignor to Hercules Powder Company, Wilmington, Del., a corporation of Delaware No Drawing. Application May 31, 1941, Serial No. 396,224

16 Claims. (Cl. 260—92.6)

This invention relates to new terpene oxidation products and to methods for their production; more particularly, it relates to oxidation products of acyclic terpenes having three double bonds per molecule and to methods for the production of the same.

In accordance with this invention, it has been found that an acyclic terpene, having three double bonds per molecule, will react with a free oxygen-containing gas, preferably in the presence of water, to produce a material which is water-insoluble and a material which is water-soluble. The water-insoluble material can be separated further into a steam-volatile and a non-steam-volatile product. However, the water-soluble material contains substantially no steam-volatile constituents.

The non-steam-volatile, water-insoluble product possesses the approximate empirical formula $(C_{10}H_{16}O_2)_x$. Vacuum distillation of this product gives a volatile oil having the approximate molecular formula $C_{10}H_{16}O_2$, and a resinous residue which is a mixture of various polymeric modifications of the monomeric product. Some depolymerization to the monomer appears to take place in the distillation. Wherever, hereinafter, in this specification and claims, the water-insoluble non-steam-volatile product of the oxidation of an acyclic terpene is referred to, the product resulting after the steam-volatile components have been removed from the water-insoluble material is thereby contemplated.

The non-steam-volatile, water-soluble product prepared in accordance with this invention has been shown, on the basis of molecular weight and combustion analyses to consist mainly of a mixture of tri- and tetrahydroxy derivatives of the particular acyclic terpene employed. Thus, in the case of allo-ocimene the product will be a mixture of tri- and tetrahydroxy derivatives of allo-ocimene.

In accordance with this invention, there may be employed as the starting material any acyclic terpene having three double bonds per molecule, referred to hereinafter as an acyclic terpene. Hence, allo-ocimene, ocimene or myrcene, etc., may be employed. It is preferred, however, that the particular terpene employed be allo-ocimene. For purposes of illustration, this preferred terpene will be employed in particular, but it will be realized that any other acyclic terpene having three double bonds per molecule may be equivalently employed.

Allo-ocimene is an acyclic terpene which, in addition to having a system of three double bonds, has them in a triply conjugated system. In its purified form it has the following average characteristics:

B. P. (16 mm.) _____ 87–87.5° C.
B. P. (760 mm.) _____ 193.5–194.5° C.
$n_d^{18°}$ _____ 1.5448
$d_o^{18°}$ _____ 0.8162
$(\alpha)_D$ _____ ±0°

The terpene is a liquid characterized by a light-yellow color, an agreeable odor and a high refraction. It may be polymerized by various methods, and the resulting products, particularly the dimeric modification, may be employed in practicing the present invention. However, it is preferred to use the monomer.

In carrying out the present invention, allo-ocimene, or another acylic terpene, is contacted with oxygen, preferably in the presence of water. There are several methods of contacting these reactants. For example, the allo-ocimene and the water may be agitated and simultaneously blown with an oxygen-containing gas. Alternatively, the oxygen-containing gas may be partially or completely saturated with water prior to contacting the allo-ocimene. Another alternative, which is particularly applicable where superatmospheric pressure is being employed, is to place the allo-ocimene or allo-ocimene and water, as desired, in a vessel which may be mechanically rocked. The oxygen-containing gas or such a gas containing vaporized $H_2O$ is then introduced into the vessel and maintained in contact with the other reactant or reactants, as the case may be, under the desired pressure with constant agitation.

Treatment of allo-ocimene, or another acyclic terpene, with an oxygen-containing gas under anhydrous conditions provides some reaction, but the rate of reaction is materially increased in the presence of water. The quantity of water which may be employed may vary over a wide range, and the amount used will affect to some extent the proportion of water-soluble, non-steamvolatile to water water-insoluble, non-steam-volatile products formed. In general, the lower the quantity of water used, the greater will be the percentage of water-insoluble, non-steam-volatile material formed; conversely, the greater the quantity of water present, the lower will be the percentage of water-insoluble, non-steam-volatile material formed.

When water in liquid form is added directly to the allo-ocimene, or other acyclic terpene, during the reaction, it may be added in widely varying amounts. Preferably, however, an amount within the range of from about 1% to about 100% on the basis of the allo-ocimene is employed. When the water is introduced in the form of a vapor contained in the oxygen-containing gas, varying amounts may be employed, and the only limitation is the point of saturation of the oxygen-containing gas. If desired, additional water in liquid form may be added to the allo-ocimene or other acyclic terpene.

The temperature of contacting is not critical and may desirably be within the range from about 0° C. to about 150° C. A temperature from about 20° C. to about 50° C. is preferred. The reaction itself is exothermic, the heat evolved being dependent upon the rapidity with which the reaction is allowed to progress. The time of reaction is dependent upon other conditions such as pressure, temperature, etc., employed, the quantity of oxygen immediately contacting the allo-ocimene, and may vary within the range of from about 2 hours to about 2 weeks. Under preferred conditions, a reaction time of from about 8 hours to about 150 hours is sufficient. The oxygen-containing gas may be used at reduced, normal or at superatmospheric pressure. Contacting at superatmospheric pressure, and in particular, at a pressure within the range of from about 100 to 2000 lbs. per sq. in., is preferred where rapid reaction and a high yield of water-insoluble, non-steam-volatile product is desired.

The reaction may be accelerated, if desired, by means of a catalyst. Suitable catalysts are oxidation catalysts, and of these the preferred catalysts are the naphthenates, stearates and resinates of cobalt, manganese and lead. Other materials which exhibit catalytic action comprise activated carbon, flake aluminum, iron powder, lead mercaptides, ammonium chloride, selenium dioxide, vanadium pentoxide, ammonium vanadate, etc. The use of a catalyst generally tends to reduce the amount of water-soluble, non-steam-volatile product. When used, the catalyst will be used preferably in an amount up to about 10% based on the weight of the allo-ocimene. Larger amounts may be used, if desired.

The oxygen-containing gas employed in the reaction is one which contains free oxygen with or without other gases which are inert to the reactants or the products. Thus, free oxygen, air, etc., may be employed.

Depending upon the particular procedure employed to accomplish reaction, the reaction product will be found to consist of one or two phases. There will usually be two phases resulting when water in liquid form is added to the acyclic terpene prior to or during reaction. One of these phases will be an aqueous phase and the other an oily, water-insoluble phase. In accordance with this invention, the oily phase will be separated and steam distilled to remove any steam-volatile terpenes, also any steam-volatile oxygenated terpenes. If desired, the entire reaction mixture may be steam distilled. However, it is simpler to steam distill only the water-insoluble phase inasmuch as there are substantially no steam-distillable compounds in the aqueous phase. There remains a water-insoluble, non-steam-volatile product possessing the approximate empirical formula $(C_{10}H_{16}O_2)_x$. As a result of steam distillation of the oily, water-insoluble product, an aqueous phase usually forms. This phase usually contains small amounts of extracted water-soluble product. Hence, this aqueous phase can be separated and added to the aqueous phase which was previously separated from the reaction mixture prior to steam distillation. Evaporation of the water by distillation at atmospheric pressure or in vacuo leaves the water-soluble product as the residue.

Alternatively, when the reaction mixture is homogeneous, as for example when no water is employed in the process or when small amounts of water vapor are present in the oxygen-containing gas employed in contacting the acyclic terpene, the entire reaction mixture may be extracted with water to remove the water-soluble product. The water-insoluble portion may be separated and treated as hereinbefore described, i. e., steam distilled to yield a product which is water-insoluble and non-steam-volatile. If desired, the homogeneous reaction mixture may be steam distilled prior to extraction with water.

Either a pure or impure form of allo-ocimene or other acyclic terpene may be employed in carrying out the processes of the invention, although a relatively pure starting material is preferred. Thus, mixtures of allo-ocimene with other less reactive terpenes such as α-pinene, β-pinene, terpinene, dipentene, etc., may be used. The product resulting from the pyrolysis of α-pinene, for example, may be used. When vaporized α-pinene is heated at elevated temperatures, an isomerization takes place which results in a product which may contain as much as 40% allo-ocimene or more, depending upon the particular conditions employed. In addition to the allo-ocimene, there will be present α-pinene, dipentene and other complex hydrocarbons. This crude allo-ocimene mixture may be concentrated by distillation. Where impure allo-ocimene is employed, the allo-ocimene content preferably should be at least about 40% by weight.

There follow several examples which illustrate specific embodiments of this invention. These examples, however, are not to be taken as being limiting. All percentages are by weight unless otherwise indicated.

EXAMPLE 1

Eight hundred and sixteen grams of 96% allo-ocimene was blown with moist air at a temperature of 25 to 30° C. for a period of 16 hours. The velocity of the moist air was kept constant at from 20 to 25 liters per hour. At the end of this period, a representative sample of the homogeneous reaction mixture was taken and steam distilled. An aqueous phase and an oily, water-insoluble, non-steam-volatile phase resulted. The latter was separated from the former which was evaporated to remove the water present. The product was a water-soluble resin. The blowing operation was continued and additional samples taken at intervals. These samples gave analyses as indicated in the following table. The figures in the "Time" column show the total interval elapsed from the inception of the blowing operation.

Table 1

| Time, hours | Sp. gr. 15.6° C./15.6° C. | Sample, grams | Percent steam volatile | Percent water-soluble non-steam-volatile | Percent water-insoluble non-steam-volatile |
|---|---|---|---|---|---|
| 16 | 0.856 | 64 | 74 | 18.6 | 7.4 |
| 64 | 0.904 | 80.4 | 51.6 | 33.8 | 14.6 |
| 72 | 0.929 | 92.5 | 26.4 | 44.7 | 18.9 |
| 99 | 0.965 | 96.5 | 19 | 53 | 28 |

As illustrative of the methods of obtaining the approximate formulas of the products of the invention, 20 grams of the water-insoluble, non-steam-volatile resin obtained as a result of the 99-hour run were vacuum distilled at 3 to 5 mm. pressure. Two grams of distillate passed over at a vapor temperature of 155° C. Analyses of the original sample and the distillate as compared with theoretical analyses follow:

| Product | Percent OH | Percent C | Percent H | Molecular wt. (Rast) |
|---|---|---|---|---|
| Original | 2.7 | 72.4 | 9.5 | 405 |
| Distillate | | 69.4 | 9.7 | 167 |
| Residue from distillation | | 73.2 | 9.7 | 374 |
| Theory for $C_{10}H_{16}O_2$ | | 71.4 | 9.5 | 168 |
| Theory for $C_{10}H_{16}O_3$ | | 65.2 | 8.7 | 184 |
| Theory for $C_{10}H_{18}O_3$ | | 63.8 | 10.2 | 187 |
| Theory for $(C_{10}H_{16}O_2)_2 \cdot C_{10}H_{16}O(OH)$ | 3.4 | 71.4 | 9.6 | 504 |

It is apparent that the distillate compares favorably with a compound having the molecular formula $C_{10}H_{16}O_2$. It is also apparent that the original water-insoluble, non-steam-volatile product was a polymeric modification of the distillate and that decomposition in the form of depolymerization occurred during distillation.

Thirty-seven grams of water-soluble, non-steam-volatile resin from the 99-hour run were vacuum distilled at 4 mm. pressure as follows:

| Fraction, ° C. | Wt., gms. | Percent C | Percent H | Molecular wt. (Rast) |
|---|---|---|---|---|
| 158–163 | 2 | 61.8 | 9.6 | 159 |
| 185–196 | 14 | 59.7 | 10.04 | 180 |
| 196–198 | 16 | 59.4 | 10.04 | 201 |
| Residue | 5 | | | |

| Theoretical formulas | Per cent C | Per cent H | Molecular wt. (Rast) |
|---|---|---|---|
| $C_{10}H_{18}(OH)_2$ | 64.2 | 10.2 | 187 |
| $C_{10}H_{16}(OH)_2$ | 63.2 | 11.5 | 190 |
| $C_{10}H_{16}(OH)_3$ | 59.8 | 11.6 | 172 |
| $C_{10}H_{18}(OH)_3$ | 58.8 | 9.3 | 204 |
| $C_{10}H_{20}(OH)_4$ | 57.7 | 11.5 | 206 |

On the basis of the above data, the water-soluble resin obtained in accordance with this invention is a poly-oxygenated allo-ocimene and probably consists mainly of trihydroxy and tetrahydroxy derivatives of allo-ocimene.

EXAMPLE 2

A mixture of 357 grams of 90% allo-ocimene and 350 grams of water was blown with oxygen while the mixture was being agitated. The blowing operation was continued for 33 hours at a temperature of 25 to 35° C. using an oxygen velocity of 20 to 25 liters per hour. The reaction mixture was steam distilled to remove steam-volatile constituents. The residue was found to consist of two phases, an oily water-insoluble phase and an aqueous phase. The aqueous phase was separated and vacuum distilled to yield a water-soluble resinous product. Thus, the reaction product was found to consist of:

Per cent
Steam-volatile _____ 27
Water-soluble, non-steam-volatile _____ 45
Water-insoluble, non-steam volatile _____ 28

In the following examples a crude form of allo-ocimene was employed. This crude allo-ocimene was one obtained from the pyrolysis of α-pinene. It consisted of 40% allo-ocimene in conjunction with α-pinene, dipentene, and a relatively small quantity of complex unidentified hydrocarbons. In certain of the examples to follow this crude allo-ocimene was concentrated to 65% allo-ocimene by distillation.

EXAMPLE 3

A mixture of 600 grams of allo-ocimene (40% pure) and 600 grams of water was agitated at 85° C. while passing a current of air through the mixture at a rate of 20 to 25 liters per hour for a period of 24 hours. The reaction mixture was steam distilled to remove the steam-volatile constituents. The residue was extracted with water heated to about 60° C. to separate the water-soluble constituents which were isolated by vacuum distillation of the extract. In this manner, the reaction product was found to consist of:

Per cent
Steam-volatile _____ 71
Water-soluble, non-steam-volatile _____ 10
Water-insoluble, non-steam-volatile _____ 19

EXAMPLE 4

Fifty grams of allo-ocimene (40% pure) were placed in a rocking-type stainless steel pressure bomb having a capacity of 500 cc. Oxygen gas was introduced at 25 to 30° C. until a pressure of 50 lbs. per sq. in. developed. Agitation was commenced. After about 2 hours, the pressure had dropped to 30 lbs. per sq. in., at which point it was increased to 60 lbs. per sq. in. by adding more oxygen. Thereafter, whenever the oxygen pressure dropped to 30 lbs. per sq. in., it was increased to a pressure between 60 and 200 lbs. per sq. in. by adding more oxygen. After a total reaction period of 54 hours, about 0.4 gram mol of oxygen had been absorbed, based on the pressure changes. The reaction mixture had increased in weight about 14 grams. Employing the same processes as in Example 3, the reaction mixture was found to consist of:

Per cent
Steam-volatile _____ 52
Water-soluble, non-steam-volatile _____ 15
Water-insoluble, non-steam-volatile _____ 33

EXAMPLE 5

Fifteen hundred grams of a crude allo-ocimene containing 40% allo-ocimene were blown with moist air at 25 to 35° C. for a period of 35 hours with agitation. The air velocity was held constant at 5-10 bubbles per second. Analysis showed the product to have the following characteristics:

Sp. gr. $\frac{15.6° C.}{15.6° C.}$ ---- 0.927
Acid number ---- 2.8
Saponification number ---- 28.0

Two hundred and thirty-two grams of this material were steam distilled as in the previous examples to yield four different products, A being the steam-volatile unreacted terpenes, B being the steam-volatile terpenes containing volatile ketones, C being the non-steam-volatile, water-insoluble material and D being the non-steam-volatile, water-soluble material. The results follow:

| Product | Yield, grams |
|---------|--------------|
| A | 65 |
| B | 63 |
| C | 60 |
| D | 50 |

Example 6

A 3150-gram quantity of 40% allo-ocimene was blown with moist air at a velocity of 20 to 25 liters per hour and at a temeprature of 25 to 30° C. with agitation. At various intervals during the blowing operation representative samples were taken and steam distilled to separate the steam-volatile components. The residue was extracted with water heated to about 60° C. to remove the water-soluble constituents. The water-soluble constituents were then isolated by vacuum distillation. The results follow:

Table 2

| Time, hours | Sp. gr. $\frac{15.6° C.}{15.6° C.}$ | Sample, grams | Per cent steam-volatile | Per cent water-soluble non-steam-volatile | Per cent water-insoluble non-steam-volatile |
|---|---|---|---|---|---|
| 24.2 | 0.8656 | 86.5 | | | |
| 36 | 0.8754 | 87.5 | 73.5 | 9 | 17.5 |
| 42 | 0.8827 | 88.3 | | | |
| 47.5 | 0.8922 | 178.4 | 65.8 | 17.8 | 16.4 |
| 56.5 | 0.9033 | 179.6 | | | |
| 65.5 | 0.9081 | 181.6 | | | |
| 74.5 | 0.9195 | 183.9 | | | |
| 79.5 | 0.9243 | 185 | 54.0 | 21 | 25 |

Example 7

Five hundred grams of 65% allo-ocimene and 500 grams of water were air blown with agitation for 26 hours at a temperature of 25 to 32° C. The air velocity was held at approximately 40 liters per hour. The resulting product was steam distilled and the constituents separated in the manner of the previous example. The results follow:

Per cent
Steam-volatile ---- 36.4
Water-soluble, non-steam-volatile ---- 48.5
Water-insoluble, non-steam-volatile ---- 15.1

The water-soluble, non-steam-volatile products of this invention may be used as softening agents in the manufacture of textiles. In addition, these materials exhibit a definite frothing action, hence they may be used in the flotation of ores. The water-insoluble resins are useful in the formulation of paints, lacquers and varnishes, also in the flotation of ores.

In addition to the products separable from the reaction mixture obtained in accordance with this invention, the reaction mixture itself may be employed and possesses great utility in the textile and ore flotation fields.

It will be understood that the details and examples hereinbefore set forth are illustrative only and that the invention as broadly described and claimed is in no way limited thereby.

What I claim and desire to protect by Letters Patent is:

1. A method for the production of an oxygenated acyclic terpene which comprises reacting an acyclic terpene having three double bonds per molecule with water and a gas containing free oxygen, as the sole reactive gas, at a temperature of from about 0° C. to about 150° C. until an appreciable portion of the acyclic terpene has reacted with the water and free oxygen to form a mixture of water-soluble and water-insoluble oxygenated acyclic terpenes.

2. A method for the production of an oxygenated acyclic terpene which comprises reacting allo-ocimene with water and a gas containing free oxygen, as the sole reactive gas, at a temperature of from about 0° C. to about 150° C. until an appreciable portion of the allo-ocimene has reacted with the water and free oxygen to form a mixture of water-soluble and water-insoluble oxygenated acyclic terpenes.

3. A method for the production of an oxygenated acyclic terpene which comprises reacting myrcene with water and a gas containing free oxygen, as the sole reactive gas, at a temperature of from about 0° C. to about 150° C. until an appreciable portion of the myrcene has reacted with the water and free oxygen to form a mixture of water-soluble and water-insoluble oxygenated acyclic terpenes.

4. A method for the production of an oxygenated acyclic terpene which comprises reacting allo-ocimene with water and air, at a temperature of from about 0° C. to about 150° C. until an appreciable portion of the allo-ocimene has reacted with the water and free oxygen to form a mixture of water-soluble and water-insoluble oxygenated acyclic terpenes.

5. A method for the production of an oxygenated acyclic terpene which comprises reacting myrcene with water and air at a temperature of from about 0° C. to about 150° C. until an appreciable portion of the myrcene has reacted with the water and free oxygen to form a mixture of water-soluble and water-insoluble oxygenated acyclic terpenes.

6. A method for the production of an oxygenated acyclic terpene which comprises reacting allo-ocimene with water and air in the presence of an oxidation catalyst at a temperature of from about 0° C. to about 150° C. until an appreciable portion of the allo-ocimene has reacted with the water and free oxygen to form a mixture of water-soluble and water-insoluble oxygenated acyclic terpenes.

7. A method for the production of an oxygenated acyclic terpene which comprises reacting myrcene with water and air in the presence of an oxidation catalyst at a temperature of from about 0° C. to about 150° C. until an appreciable portion of the myrcene has reacted with the water and free oxygen to form a mixture of water-soluble and water-insoluble oxygenated acyclic terpenes.

8. A method for the production of an oxygenated acyclic terpene which comprises reacting allo-ocimene with water and air in the presence of an oxidation catalyst at a temperature of from about 20° C. to about 50° C. until an appreciable portion of the allo-ocimene has reacted with the water and free oxygen to form a mixture of water-soluble and water-insoluble oxygenated acyclic terpenes.

9. A method for the production of an oxygenated acyclic terpene which comprises reacting myrcene with water and air in the presence of an oxidation catalyst at a temperature of from about 20° C. to about 50° C. until an appreciable portion of the myrcene has reacted with the water and free oxygen to form a mixture of water-soluble and water-insoluble oxygenated acyclic terpenes.

10. As a new composition of matter, an oxygenated acyclic terpene formed by reacting an acyclic terpene having three double bonds per molecule with water and a gas containing free oxygen, as the sole reactive gas, at a temperature of from about 0° C. to about 150° C. until an appreciable portion of the acyclic terpene has reacted with the water and free oxygen.

11. As a new composition of matter, an oxygenated acyclic terpene formed by reacting allo-ocimene with water and a gas containing free oxygen, as the sole reactive gas, at a temperature of from about 0° C. to about 150° C. until an appreciable portion of the allo-ocimene has reacted with the water and free oxygen.

12. As a new composition of matter, an oxygenated acyclic terpene formed by reacting myrcene with water and a gas containing free oxygen, as the sole reactive gas, at a temperature of from about 0° C. to about 150° C. until an appreciable portion of the myrcene has reacted with the water and free oxygen.

13. A water-soluble, nonsteam-volatile oxygenated acyclic terpene formed by reacting allo-ocimene with water and a gas containing free oxygen, as the sole reactive gas, at a temperature of from about 0° C. to about 150° C. until an appreciable portion of the allo-ocimene has reacted with the water and free oxygen to form a mixture of water-soluble and water-insoluble oxygenated acyclic terpenes, and recovering the water-soluble, nonsteam-volatile product.

14. A water-insoluble, nonsteam-volatile oxygenated acyclic terpene having the empirical formula $(C_{10}H_{16}O_2)_x$ in which $x$ is a whole number greater than one, said product being formed by reacting allo-ocimene with water and a gas containing free oxygen, as the sole reactive gas, at a temperature of from about 0° C. to about 150° C. until an appreciable portion of the allo-ocimene has reacted with the water and free oxygen to form a mixture of water-soluble and water-insoluble oxygenated acyclic terpenes, and recovering the water-insoluble, nonsteam-volatile product.

15. A water-soluble, oxygenated acyclic terpene containing at least three hydroxyl groups, said product being formed by reacting allo-ocimene with water and a gas containing free oxygen, as the sole reactive gas, at a temperature of from about 0° C. to about 150° C. until an appreciable portion of the allo-ocimene has reacted with the water and free oxygen to form a mixture of water-soluble and water-insoluble oxygenated acyclic terpenes, and recovering the water-soluble product containing at least three hydroxyl groups.

16. A water-insoluble, nonsteam-volatile oxygenated acyclic terpene formed by reacting myrcene with water and a gas containing free oxygen, as the sole reactive gas, at a temperature of from about 0° C. to about 150° C. until an appreciable portion of the myrcene has reacted with the water and free oxygen to form a mixture of water-soluble and water-insoluble oxygenated acyclic terpenes, and recovering the water-insoluble product.

ALFRED L. RUMMELSBURG.